United States Patent [19]

Suk

[11] Patent Number: 5,408,909
[45] Date of Patent: Apr. 25, 1995

[54] ARRANGEMENT FOR MEASURING AND CUTTING A WORKPIECE

[76] Inventor: Yong S. Suk, 864 51st Ave., Lachine, Quebec, Canada, H8T 2W6

[21] Appl. No.: 188,826

[22] Filed: Jan. 31, 1994

[51] Int. Cl.⁶ .............................. B26D 7/01
[52] U.S. Cl. ..................... 83/614; 83/467.1; 83/522.19
[58] Field of Search ...... 83/467.1, 578, 614, 83/522.17, 522.19, 581, 676

[56] References Cited

U.S. PATENT DOCUMENTS

| | | | |
|---|---|---|---|
| 868,656 | 10/1907 | Gramelspacher | 83/614 X |
| 3,964,360 | 6/1976 | Schwartz | 83/522.19 X |
| 4,524,894 | 6/1985 | Leblond | 225/2 |
| 4,667,555 | 5/1987 | Lisec | 83/879 |
| 5,309,642 | 5/1994 | McGinnis | 83/614 X |

Primary Examiner—Richard K. Seidel
Assistant Examiner—Raymond D. Woods
Attorney, Agent, or Firm—Swabey Ogilvy Renault

[57] ABSTRACT

A workpiece support member has at least one straight edge, and a guide rail extends along the edge. A beam holder is mounted for movement along the guide rail and supports a transverse beam member. The free end of the beam member supports a blade holder, and a blade is removably mounted in the blade holder. The distance between the blade and the guide rail is adjustable.

3 Claims, 2 Drawing Sheets

ARRANGEMENT FOR MEASURING AND CUTTING A WORKPIECE

BACKGROUND OF INVENTION

1. Field of the Invention

The invention relates to an arrangement for measuring and cutting a workpiece. More specifically, the invention relates to a portable such arrangement.

2. Description of Prior Art

Arrangements for measuring and cutting workpieces are known in the art as illustrated in, for example, U.S. Pat. Nos. 4,667,555, Lisec, May 26, 1987 and 4,524,894, Leblond, Jun. 25, 1985. However, both of these arrangements require fixed tables so that they cannot be seen as portable. In addition, the Leblond arrangement uses motors for positioning the cutter element.

SUMMARY OF INVENTION

It is therefore an object of the invention to provide an arrangement for measuring and cutting a workpiece which overcomes the disadvantages of the prior art.

It is a more specific object of the invention to provide a portable such arrangement.

In accordance with a particular embodiment of the invention there is provided a workpiece measuring and cutting tool which comprises a workpiece support member having an upper flat surface and at least one straight edge. A right-angled guide rail is immovably secured over the upper flat surface and extends along the straight edge. A beam holder is mounted for sliding movement along an upstanding flange of the guide rail disposed at right angles to the upper flat surface and supports a transverse beam member which extends across the workpiece support member in an opening. A blade holder is immovably fixed to a free end of the beam member. A blade is removably mounted in the blade holder. The beam holder and the blade holder maintain the transverse beam member elevated a predetermined distance above and parallel to the upper flat surface. Clamping means is provided in the blade holder for adjustably securing the beam member to the beam holder to adjust the distance between the blade and the guide rail.

The workpiece can be glass, plywood, gyprock or other such flat materials.

BRIEF DESCRIPTION OF DRAWINGS

The invention will be better understood by an examination of the following description, together with the accompanying drawings, in which.

DESCRIPTION OF PREFERRED EMBODIMENTS

Figure 1:
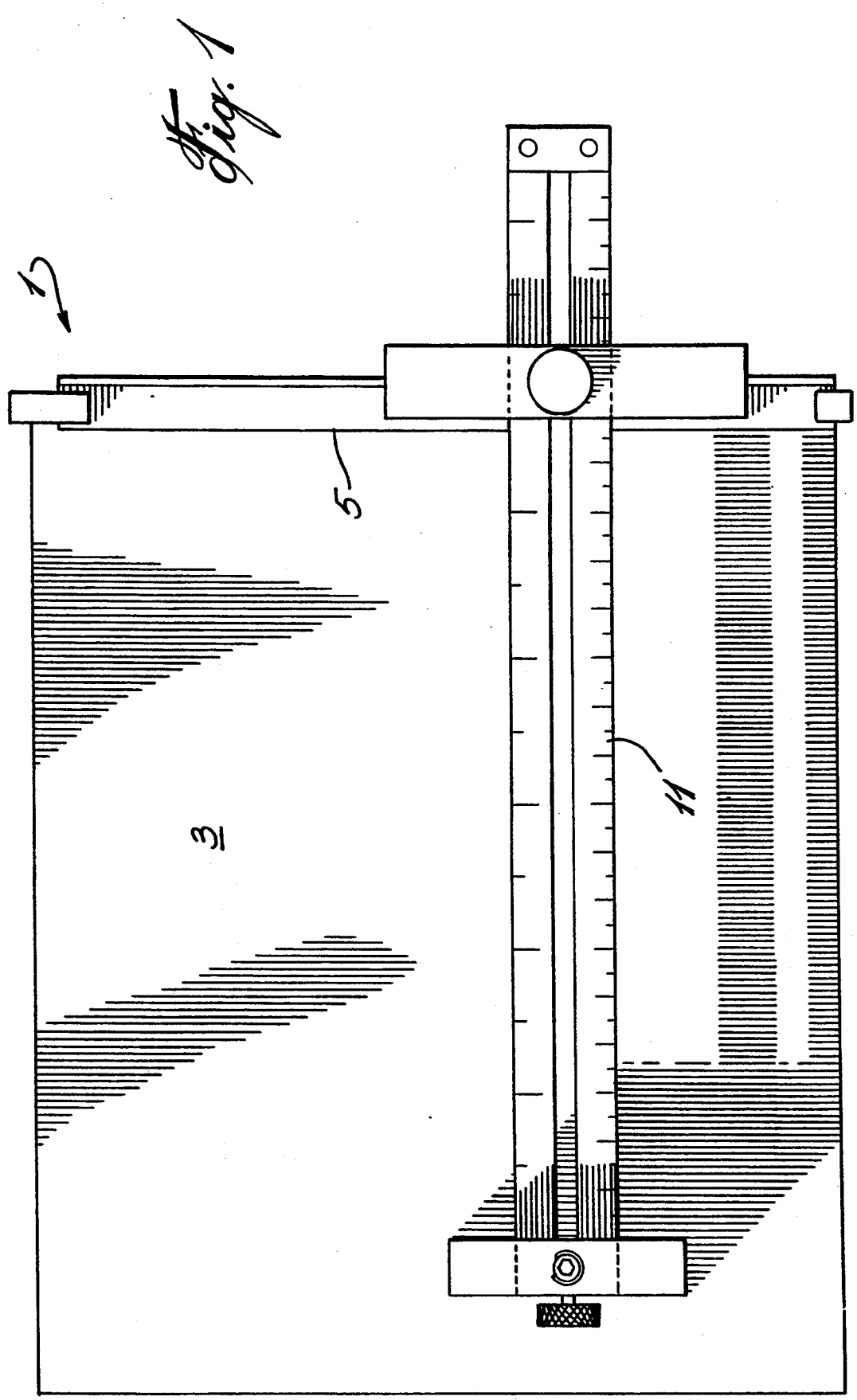
FIG. 1 is a plan view of the arrangement without the cross-beam.

Referring to the drawings, the arrangement, illustrated generally at 1, comprises a workpiece support 3. The workpiece support may be, for example, a piece of plywood or the like having at least one straight edge 5. In the preferred embodiment, the workpiece has four straight edges at right angles to each other, that is, the workpiece is in the shape of a rectangle.

Figure 2:
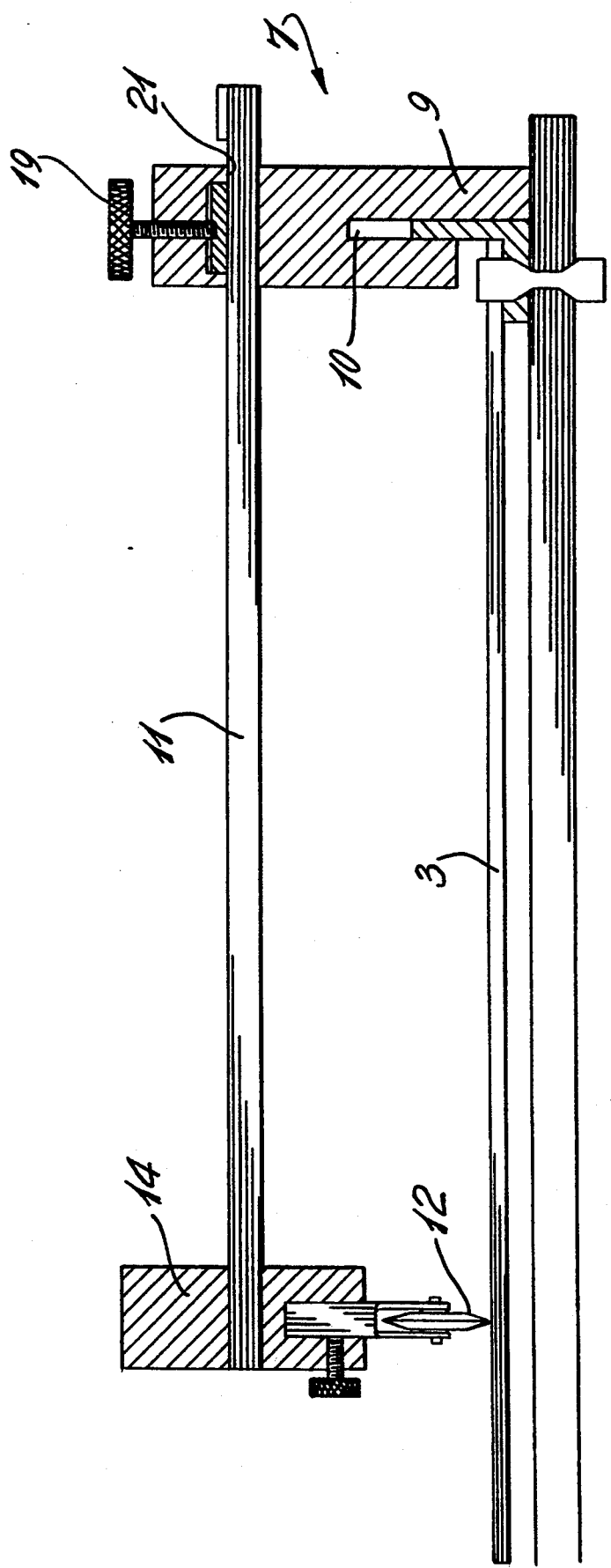
FIG. 2 is an end view of the invention with the cross-beam.

Extending along the one straight edge 5 is a guide rail 7. As seen in FIG. 2, the guide rail is substantially L-shaped in cross-section. The horizontal member of the L supports the workpiece 3.

As also seen in FIG. 2, a cross-beam holder 9 is mounted for movement along the guide rail. Specifically, the beam holder 9 includes a notch 10 which is mounted on the vertical portion of the L of the guide rail so that the beam holder 9 can be moved up and down along the guide rail.

The beam holder 9 supports a cross-beam 11. Disposed at the free end of the cross-beam 11 is a blade holder 14. A removable blade 12 is removably mounted in the blade holder 14. The blade 12 can be either a rotatable or fixed blade.

The beam holder 9 includes a means for adjusting the distance between the blade and the guide. In the illustrated embodiment, this comprises a wing screw 19. The cross-beam 11 extends through an opening 21 in the beam holder 9. Thus, the beam is movable across the workpiece by moving the beam within the opening 21.

As can be seen in FIG. 1, the cross-beam includes a scale, and the position of the blade is adjusted by movement of the cross-beam to a desired distance from the guide rail. The wing screw 19 is then tightened so that the cross-beam is fixed at that position.

To perform the cutting operation, the workpiece (not shown), having been mounted on the workpiece support 3, underlies the blade 12. The user presses down on the blade holder 14 so that the blade 12 will engage the workpiece, and the cross-beam 11 is moved along the guide rail 7. Thus, the cutting operation is performed at a predetermined distance between the blade and the guide rail, and the width of the cut workpiece is equal to this predetermined distance.

In the illustrated embodiment, the blade is a rotary blade, although other blades could be used as is well known in the art.

Although a particular embodiment has been described, this was for the purpose of illustrating, but not limiting, the invention. Various modifications, which will come readily to the mind of one skilled in the art, are within the scope of the invention as defined in the appended claims.

I claim:

1. A workpiece measuring and cutting tool, comprising:
    a workpiece support member having an upper flat surface and at least one straight edge;
    a right-angle guide rail immovably secured over said upper flat surface and extending along said straight edge;
    a beam holder mounted for sliding movement along an upstanding flange of said guide rail disposed at right angles to said upper flat surface and supporting a transverse beam member which extends across said workpiece support member in an opening in said beam holder;
    a blade holder immovably fixed to a free end of said beam member;
    a blade removably mounted in said blade holder;
    said beam holder and blade holder maintaining said transverse beam member elevated a predetermined distance above and parallel to said upper flat surface;
    clamping means is provided in said beam holder for adjustably securing said beam member in said opening said beam holder to adjust the distance between said blade and said guide rail.

2. A tool as defined in claim 1 wherein said workpiece support is in the shape of a rectangle.

3. A tool as defined in claim 2 wherein said clamping means on said blade holder comprises screw means.

* * * * *